US008069253B2

(12) United States Patent
Camarillo et al.

(10) Patent No.: US 8,069,253 B2
(45) Date of Patent: Nov. 29, 2011

(54) IP LINK ESTABLISHMENT ACROSS A DATA NETWORK

(75) Inventors: Gonzalo Camarillo, Helsinki (FI); Sébastien Pierrel, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/667,616

(22) PCT Filed: Jul. 4, 2007

(86) PCT No.: PCT/EP2007/056762
§ 371 (c)(1),
(2), (4) Date: Mar. 22, 2010

(87) PCT Pub. No.: WO2009/003526
PCT Pub. Date: Jan. 8, 2009

(65) Prior Publication Data
US 2010/0185725 A1 Jul. 22, 2010

(51) Int. Cl.
*G06F 15/16* (2006.01)
(52) U.S. Cl. ........................................ 709/228; 709/227
(58) Field of Classification Search .......... 709/227–228, 709/230, 203
See application file for complete search history.

(56) References Cited

U.S. PATENT DOCUMENTS

| | | | | |
|---|---|---|---|---|
| 6,098,108 A | * | 8/2000 | Sridhar et al. | 709/239 |
| 6,397,255 B1 | * | 5/2002 | Nurenberg et al. | 709/228 |
| 2006/0291502 A1 | * | 12/2006 | Kalofonos | 370/466 |
| 2007/0147343 A1 | * | 6/2007 | Sasaki et al. | 370/352 |
| 2009/0003321 A1 | * | 1/2009 | Bian et al. | 370/352 |

OTHER PUBLICATIONS

Guha Saikat et al: "NUTSS: A SIP-based approach to UDP and rep network connectivity" Proceedings of ACM SIGCOMM, XX, XX, Aug. 30, 2004, pp. 43-48, XP002397377; p. 43, col. 2, line 1-line 3; p. 43, col. 2, line 37-line 43; paragraphs [0002], [04.1]; figures 4,5; table 1.

* cited by examiner

*Primary Examiner* — Faruk Hamza
(74) *Attorney, Agent, or Firm* — Roger S. Burleigh

(57) ABSTRACT

Methods of establishing an IP link between first and second applications running at respective first and second nodes are provided. The first and second applications are arranged to initiate link establishment over a transport layer by issuing a call to their respective operating system socket Application Programming Interfaces. The methods include at said first node, intercepting a socket call generated by said first application and redirecting the socket call to a SIP-based application resident at said first node; and initiating an IP session with said second node using the SIP protocol.

12 Claims, 3 Drawing Sheets

IP LINK ESTABLISHMENT ACROSS A DATA NETWORK

CROSS REFERENCE TO RELATED APPLICATION

This application is a 35 U.S.C. §371 national stage application of PCT International Application No. PCT/EP2007/056762, filed on Jul. 4, 2007, the disclosure and content of which are incorporated by reference herein as if set forth in its entirety. The above-referenced PCT International Application was published in the English language as International Publication No. WO 2009/003526 A1 on Jan. 8, 2009.

TECHNICAL FIELD

The present invention relates to IP link establishment across a data network and in particular, though not necessarily, to the establishment of an IP link for transporting data between legacy applications designed to make use of TCP and or UDP.

BACKGROUND

Internet applications such as network-based games and collaboration tools often need to exchange traffic between endpoints in an end-to-end fashion. For some of these applications, one endpoint behaves as the server (i.e. source) while the other behaves as the client (i.e. destination). In other applications, all endpoints behave as both client and server. Typically, connections are established between endpoints using the Transport Control Protocol (TCP) or the User Datagram Protocol (UDP) or sometimes a combination of both.

Some applications work well as long as the endpoints behaving as servers have public IP addresses. However, some applications require clients to have a public IP address as well, for example to allow servers to send notifications to clients. Given that endpoints in the current Internet are often behind Network Address Translators (NATs), applications that require one or more participants to have public IP addresses typically do not work. It is unacceptable that an application will work with some users having public IP addresses but will not work for other users not having public IP addresses as this will likely result in confusion and frustration.

SUMMARY

A reliable mechanism for establishing IP links between legacy applications running at endpoints, and which is independent of the allocation of public IP addresses to those endpoints, is desirable.

According to a first aspect of the present invention there is provided a method of establishing an IP link between first and second applications running at respective first and second nodes. The first and second applications are arranged to initiate link establishment over a transport layer by issuing a call to their respective operating system socket Application Programming Interfaces. The method comprises 1) at said first node, intercepting a socket call generated by said first application and redirecting the socket call to a SIP-based application resident at said first node, and 2) initiating an IP session with said second node using the SIP protocol.

Embodiments of the present invention allow legacy applications to "piggyback" related IP sessions over a SIP-based infrastructure. However, as this infrastructure is transparent to the legacy applications, no changes to these applications are required.

According to a first embodiment, said first node is a client and said second node is a server. Prior to steps 1) and 2), at said second node, a socket call to bind a socket generated by said second application is intercepted, redirected to a SIP-based application resident at said second node, and the SIP-based application is prepared to receive a SIP session establishment request from said first node. In order to make the legacy application at the second node "visible" to peer first nodes, upon receipt of the redirected socket call at the SIP-based application of said second node, a globally routable Uniform Resource Identifier is published using a presence service, the globally routable Uniform Resource Identifier being mapped to the bound socket at said second node. The user at the second node may be prompted to enter a globally routable Uniform Resource Identifier.

Similarly, upon receipt of a redirected socket call at the first node, a user may be prompted to enter a Uniform Resource Identifier. This could be a globally routable URI published using a presence service.

In the case where said transport layer is a User Datagram Protocol, and said socket call generated by said first application is a call to establish an unconnected User Datagram Protocol socket, the method may further comprise associating the established IP session with the destination IP address and port number, wherein further calls to the same socket associated with a different IP addresses and port numbers are treated as calls to establish different IP sessions.

According to a second aspect of the present invention there is provided a node for use in a communication system. The node is configured with a legacy application, an operating system providing a socket Application Programming Interface, and a SIP-based application, the operating system being arranged to intercept a socket call generated by said legacy application and intended to establish an IP session with a peer node over a transport layer, and to redirect it to said SIP-based application resident at said first node, and said SIP-based application being arranged to initiate an IP session with said peer node using the SIP protocol. The node may be a mobile wireless terminal.

According to a third aspect of the present invention there is provided a server for use in a communication system. The server is configured with a legacy application, an operating system providing a socket Application Programming Interface, and a SIP-based application, the operating system being arranged to intercept a socket Application Programming Interface call to bind a socket of a transport layer and to redirect the call to the SIP-based application, the SIP-based application being arranged in turn to prepare for the receipt of SIP session initiation requests associated with said legacy application.

DETAILED DESCRIPTION

The 3GPP organisation has specified a subsystem known as the IP Multimedia Subsystem (IMS) for supporting traditional telephony as well as new IP multimedia services (3GPP TS 22.228, TS 23.228, TS 24.229, TS 29.228, TS 29.229, TS 29.328 and TS 29.329 Releases 5 to 7), with particular applicability to UMTS networks. IMS provides key features to enrich the end-user person-to-person communication experience through the use of standardised IMS Service Enablers, which facilitate new rich person-to-person (client-to-client) communication services as well as person-to-content (client-to-server) services over IP-based networks.

The IMS makes use of the Session Initiation Protocol (SIP) to set up and control calls or sessions between user terminals (or user terminals and application servers). The Session Description Protocol (SDP), carried by SIP signaling, is used to describe and negotiate the media components of the session. Whilst SIP was created as a user-to-user protocol, IMS allows operators and service providers to control user access to services and to charge users accordingly.

Figure 1:
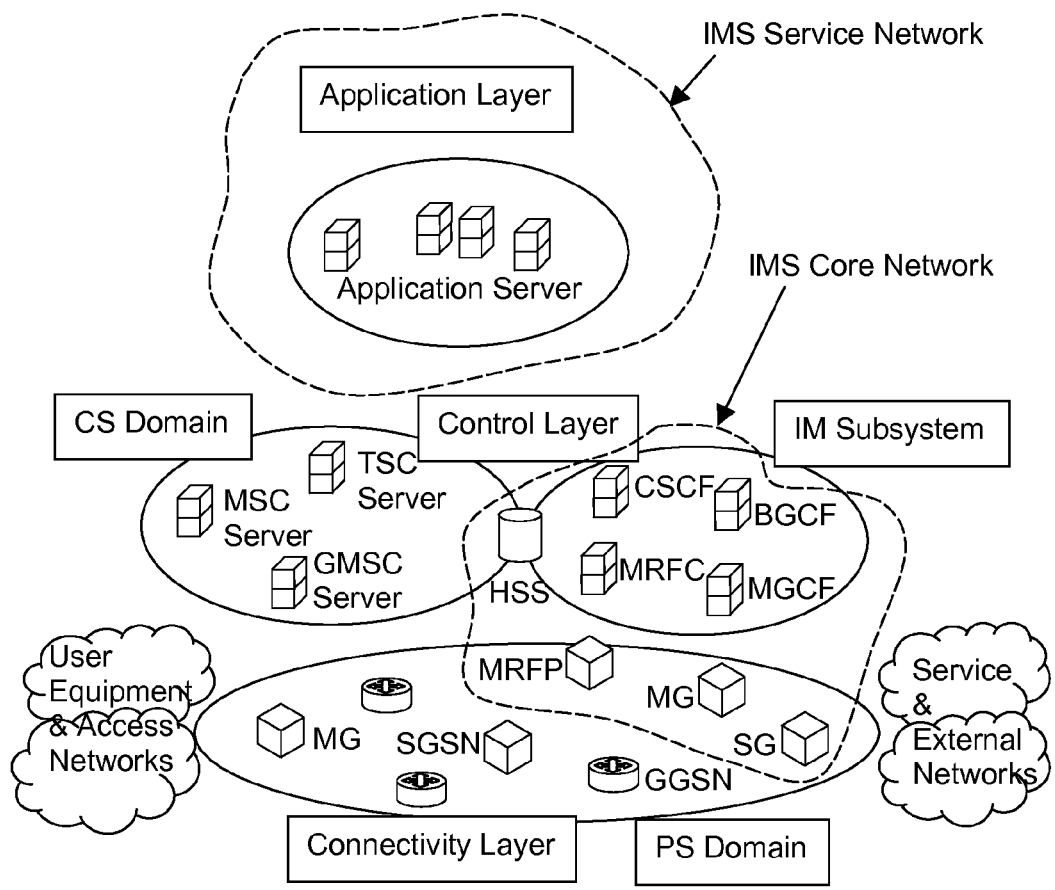
FIG. 1 illustrates schematically the integration of an IP Multimedia Subsystem into a 3G mobile communications system.

FIG. 1 of the accompanying drawings illustrates schematically how the IMS fits into the mobile network architecture in the case of a GPRS/PS access network (IMS can of course operate over other access networks). Call Session Control Functions (CSCFs) operate as SIP proxies within the IMS. The IMS architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. In IMS, when a SIP terminal performs a registration, the IMS authenticates the user, and allocates an S-CSCF to that user from the set of available S-CSCFs. Whilst the criteria for allocating S-CSCFs is not specified by IMS, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the IMS.

During the registration process, it is the responsibility of the I-CSCF to select an S-CSCF if an S-CSCF is not already selected. The I-CSCF receives the required S-CSCF capabilities from the home network's Home Subscriber Server (HSS), and selects an appropriate S-CSCF based on the received capabilities. [It is noted that S-CSCF allocation is also carried out for a user by the I-CSCF in the case where the user is called by another party, and the user is not currently allocated an S-CSCF.] When a registered user subsequently sends a session request to the IMS, the P-CSCF is able to forward the request to the selected S-CSCF based on information received from the S-CSCF during the registration process.

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment. Different IFCs may be applied to different call cases. The IFCs are received by the S-CSCF from an HSS during the IMS registration procedure as part of a user's User Profile. Certain Application Servers will perform actions dependent upon subscriber identities (either the called or calling subscriber, whichever is "owned" by the network controlling the Application Server). For example, in the case of call forwarding, the appropriate (terminating) Application Server will determine the new terminating party to which a call to a given subscriber will be forwarded. In the case that an IFC indicates that a SIP message received at the S-CSCF should be forwarded to a particular SIP AS, that AS is added into the message path. Once the SIP message is returned by the AS to the S-CSCF, it is forwarded on towards its final destination, or forwarded to another AS if this is indicated in the IFCs.

Addressing in the IMS is handled using public user identities (SIP addresses) that are allocated to users by an IMS network operator. A given user may be allocated one or more public user identities. An operator owning the domain "ims-operator.com" will allocate public user identities such as "sip: john.smith@ims-operator.com", where the user portion of the SIP URI is used to differentiate between users while the domain points to the IMS operator's network.

The IMS is an "access-agnostic" architecture that has been designed with NAT traversal in mind. IMS terminals get access to the IMS network even when they do not have public IP addresses—the only requirement is that they have a public user identity. Once a terminal accesses the IMS network, it can establish different media flows over different transport protocols.

An operating system is generally provided with a socket Application Programming Interface (API) which allows applications and transport layers to exchange data. The socket API comprises a set of functions which perform specific tasks. For example, one function may allow an application to open a UDP socket whilst another function allows the application to open a UDP socket (connected or unconnected). Once the socket is opened, a socket ID is provided to the application. Thereafter, the application can send data to the transport layer using another API function, using the associated socket ID.

The IMS architecture can be used to establish UDP or TCP flows (or both) between endpoints so that applications implemented on those endpoints can communicate with one another using those flows. It is proposed here to use the IMS to establish flows for use by non-IMS applications. These applications are referred to hereinafter as "legacy" applications. As a legacy application's source code is often unavailable and modifying it to use the flows established by the IMS is, consequently, impossible or impractical, use of the IMS to establish the necessary flows is desirable. However, in order to achieve this, it is necessary to intercept calls to the operating system's socket Application Programming Interface and to redirect them to an IMS application present at the endpoint (and away from the intended destination transport layer). This IMS application may be an application dedicated for this specific purpose, or may be an application designed to handle other IMS services, e.g. voice and multimedia calls.

Figure 2:
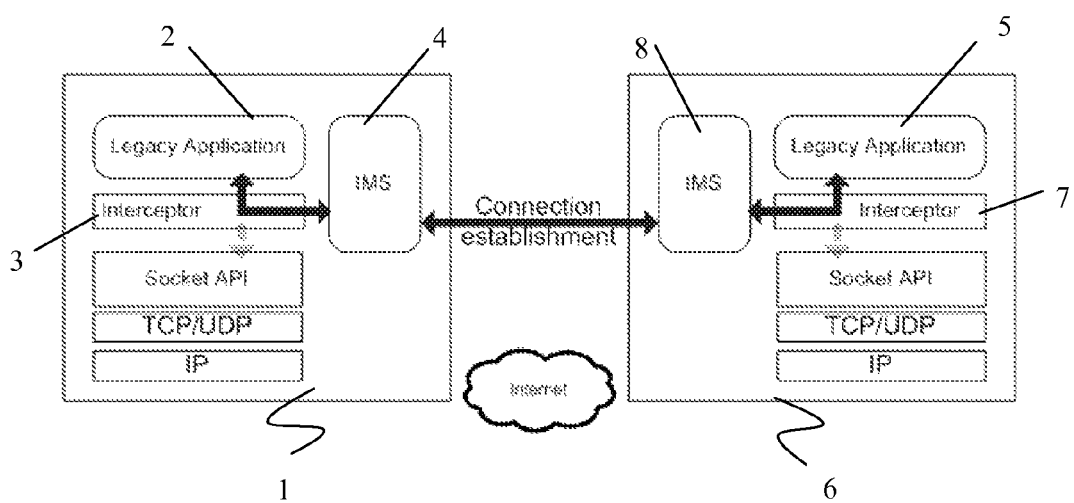
FIG. 2 illustrates schematically user terminal architectures for using IMS to establish media flows for legacy applications.
Figure 3:
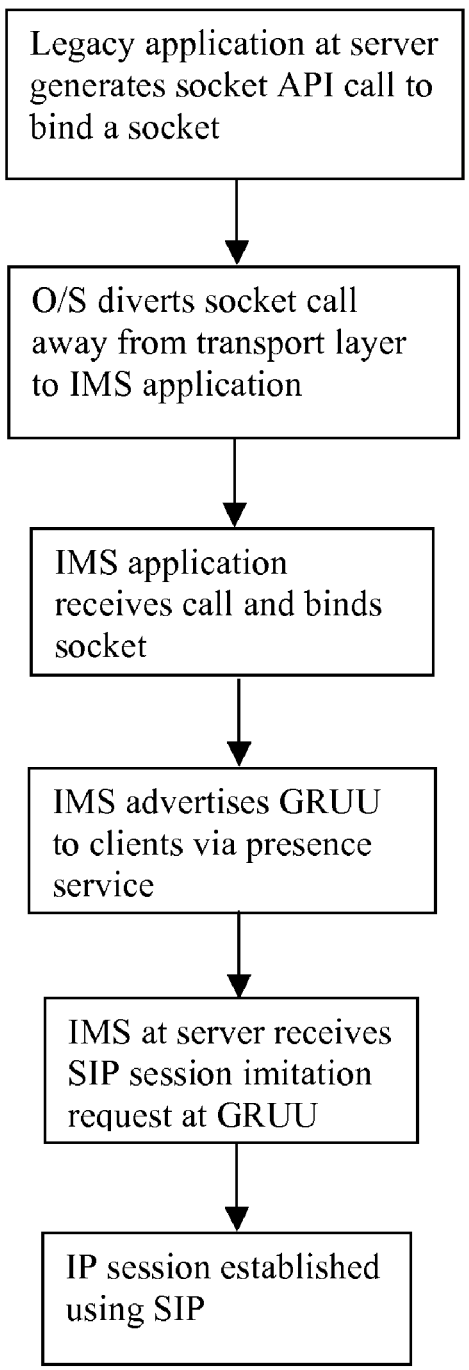
FIG. 3 is a flow diagram illustrating a method for establishing media flows between legacy applications.

In Linux/Unix systems, it is possible to use the LD_PRELOAD call interposer in order to intercept socket calls from an application and to redirect them to the IMS application. In Windows™ systems, the "detours" library provides the same functionality. FIG. 2 illustrates how the system call interceptor fits into the network layer model.

Depending on the type of the socket call that is intercepted and redirected, the IMS application takes different actions.

Consider firstly a server 1 which in use is contacted by clients, and at which a legacy application 2 is resident. As described earlier, the server 1 will attempt to bind a socket to the server's IP address and the port number used by the legacy application 2. This might occur when the server is first powered-up. According to the procedure described here, any attempt to create this binding will be intercepted at an interception layer 3 and redirected to the IMS application 4. When the IMS application is notified of the binding attempt, it prepares itself to receive an IMS session establishment request for that application from remote clients. The IMS application provides a dummy remote IP address and port number pair to the legacy application via a socket API function. The legacy application also receives the allocated socket ID.

The IMS application can announce the ability to handle sessions related to the legacy application using some suitable presence service (the IMS presence service is based upon IETF RFC 3856). To facilitate this, the IMS application at the server may prompt the user (or possibly system administrator/operator) to provide a description, the name, or a reference for the legacy application. The IMS application publishes to the presence system a GRUU (globally routable user agent URI) for the legacy application together with the description, name, or reference provided by the user.

On receiving an IMS session establishment request from a remote client on such a GRUU, the IMS application maps the GRUU to the socket ID of the legacy application, and notifies the legacy application via the bound socket. If the legacy application has data to send to the client, it uses the appropriate socket API and the allocated socket ID (the dummy IP address and port number are not used). Thus, the IMS application is completely transparent to the legacy application which behaves as if the requested session had been established.

As described earlier, clients can use connected sockets towards servers. When the legacy application 5 at a client 6 attempts to connect a socket, the interceptor 7 redirects the call to the IMS application 8 resident at the client. The IMS application should then prompt the user to provide the URI of the destination endpoint and establish an IMS session consisting of a flow of the requested type (UDP or TCP) towards that URI. That is, the IMS application ignores the destination IP address and port number used in the socket call and instead uses the URI provided by the user. The user can obtain this URI using presence (e.g. as a GRUU) or it may be otherwise known to the user. The legacy application receives the allocated socket ID and subsequently uses this to send data. The IMS application is transparent to the legacy application.

Unconnected UDP sockets can handle data destined for different destination IP addresses and port numbers. In contrast to TCP sockets and connected UDP sockets, the socket call made by an application includes the destination address and port number as well as the socket ID. In order to handle legacy applications making use of unconnected UDP sockets, the IMS application needs to check the destination IP address and port number every time the application attempts to send data. If the legacy application reuses the same socket but provides an IP address or port number for which the socket was established, the IMS application acts as if the legacy application was opening a new socket towards a new destination. Of course, from the point of view of the legacy application, it sees only a single unconnected UDP socket.

It will also be appreciated by the person of skill in the art that various modifications may be made to the above-described embodiments without departing from the scope of the present invention. For example, whilst the above discussion has been concerned with the use of IMS to establish call flows, the invention is also directly applicable to SIP architectures other than IMS. Such SIP architectures typically implement NAT traversal by using SBCs (Session Border Controllers) or ICE (Interactive Connectivity Establishment). An example is the VoIP Buster™ architecture.

The invention claimed is:

1. A method of establishing an IP link between first and second applications running at respective first and second nodes, the first and second applications being arranged to initiate link establishment over a transport layer by issuing a call to theft respective operating system socket Application Programming Interfaces, the method comprising:
   1) at said second node, intercepting a socket call to bind a socket, generated by said second application, redirecting the socket call to a SIP-based application resident at said second node, and preparing the SIP-based application to receive a SIP session establishment request from remote nodes;
   2) upon receipt of the redirected socket call at the SIP-based application of said second node, publishing a globally routable Uniform Resource Identifier using a presence service, the globally routable Uniform Resource Identifier being mapped to the bound socket at said second node;
   3) at said first node, intercepting a socket call generated by said first application and redirecting the socket call to a SIP-based application resident at said first node; and
   4) initiating an IP session with said second node using the SIP protocol and said globally routable Uniform Resource Identifier.

2. The method according to claim 1 and comprising, upon receipt of the redirected socket call at the SIP-based application of said second node, prompting a user to enter a Uniform Resource Identifier, receiving the input Uniform Resource Identifier, and publishing the Uniform Resource Identifier as said globally routable Uniform Resource Identifier.

3. The method according to claim 2 and comprising, upon receipt of the redirected socket call at the SIP-based application of said first node prompting a user to enter said globally routable Uniform Resource Identifier, receiving the input globally routable Uniform Resource Identifier, and using the received globally routable Uniform Resource Identifier as destination address to establish an IP session with said second node.

4. The method according to claim 3, wherein said socket call intercepted at said first node is a request to connect a socket of the transport layer at the first application.

5. The method according to claim 1, wherein said step of initiating an IP session comprises establishing a traffic flow or flows with said second node using the transport layer to which said call was directed.

6. The method according to claim 1, wherein said first node acts as a client and said second node acts as a server.

7. The method according to claim 1, wherein said first node acts as a server and said second node acts as a client.

8. The method according to claim 1, wherein both said first node and said second nodes act as server.

9. The method according to claim 1 and comprising, at each node, reporting a dummy remote IP address and port number to the respective application.

10. The method according to claim 1, said transport layer being Transport Control Protocol.

11. The method according to claim 1, said transport layer being User Datagram Protocol.

12. A method of establishing an IP link between first and second applications running at respective first and second nodes, the first and second applications being arranged to initiate link establishment over a transport layer by issuing a call to theft respective operating system socket Application Programming Interfaces, said transport layer being User Datagram Protocol, the method comprising:

1) at said second node, intercepting a socket call to bind a socket, generated by said second application, redirecting the socket call to a SIP-based application resident at said second node, and preparing the SIP-based application to receive a SIP session establishment request from remote nodes;

2) upon receipt of the redirected socket call at the SIP-based application of said second node, publishing a globally routable Uniform Resource Identifier using a presence service, the globally routable Uniform Resource Identifier being mapped to the bound socket at said second node:

3) at said first node, intercepting a socket call generated by said first application and redirecting the socket call to a SIP-based application resident at said first node; and 4) initiating an IP session with said second node using the SIP protocol and said globally routable Uniform Resource Identifier, wherein said socket call generated by said first application is a call to establish an unconnected User Datagram Protocol socket, the method further comprising associating the established IP session with the destination IP address and port number, wherein further calls to the same socket associated with a different IP addresses and port numbers are treated as calls to establish different IP sessions.

* * * * *

UNITED STATES PATENT AND TRADEMARK OFFICE
CERTIFICATE OF CORRECTION

| | | |
|---|---|---|
| PATENT NO. | : 8,069,253 B2 | Page 1 of 1 |
| APPLICATION NO. | : 12/667616 | |
| DATED | : November 29, 2011 | |
| INVENTOR(S) | : Camarillo et al. | |

It is certified that error appears in the above-identified patent and that said Letters Patent is hereby corrected as shown below:

In Column 6, Line 9, in Claim 1, delete "theft" and insert -- their --, therefor.

In Column 6, Line 67, in Claim 12, delete "theft" and insert -- their --, therefor.

In Column 7, Line 15, in Claim 12, delete "node:" and insert -- node; --, therefor.

Signed and Sealed this
Twenty-first Day of February, 2012

David J. Kappos
*Director of the United States Patent and Trademark Office*